United States Patent
Rephaeli et al.

(10) Patent No.: US 10,445,607 B2
(45) Date of Patent: Oct. 15, 2019

(54) OPTICAL IMPLEMENTATION OF MACHINE LEARNING FOR REAL TIME INCREASED CONTRAST VIA MULTIPLE WAVELENGTH ILLUMINATION WITH TUNABLE POWER

(71) Applicant: Verily Life Sciences LLC, Mountain View, CA (US)

(72) Inventors: Eden Rephaeli, Menlo Park, CA (US); Vidya Ganapati, San Jose, CA (US); Daniele Piponi, Oakland, CA (US); Thomas Teisseyre, Pacifica, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 236 days.

(21) Appl. No.: 15/460,927

(22) Filed: Mar. 16, 2017

(65) Prior Publication Data

US 2017/0270382 A1    Sep. 21, 2017

Related U.S. Application Data

(60) Provisional application No. 62/310,539, filed on Mar. 18, 2016.

(51) Int. Cl.
*G06K 9/20* (2006.01)
*G01J 3/10* (2006.01)
(Continued)

(52) U.S. Cl.
CPC .............. *G06K 9/2027* (2013.01); *G01J 3/10* (2013.01); *G01J 3/2823* (2013.01);
(Continued)

(58) Field of Classification Search
CPC .................................................. G06K 9/2027
See application file for complete search history.

(56) References Cited

U.S. PATENT DOCUMENTS 5,751,450 A * 5/1998 Robinson .................. G01J 3/46
358/504
9,367,909 B2 * 6/2016 Tin ......................... G06T 7/0004
(Continued)

OTHER PUBLICATIONS

Liu, C., et al., "Discriminative Illumination: Per-Pixel Classification of Raw Materials Based on Optimal Projections of Spectral BRDF," IEEE Transactions on Pattern Analysis and Machine Intelligence, vol. 36, No. 1, p. 86-98 (2014).
(Continued)

*Primary Examiner* — James M Pontius
(74) *Attorney, Agent, or Firm* — McDonnell Boehnen Hulbert & Berghoff LLP (57) ABSTRACT

An imaging system (e.g., hyperspectral imaging system) receives an indication to compare a first object and a second object (e.g., two anatomical structures or organs in a medical environment). The imaging system accesses a classification vector for the first object and the second object, the classification vector having been extracted by separating a plurality of collected reflectance values for the first object from a plurality of collected reflectance values for the second object. A set of optimal illumination intensities for one or more spectral illumination sources of the imaging system is determined based on the extracted classification vector. The first and second objects are illuminated with the determined illumination intensities. A high-contrast image of the first and second objects is provided for display, such that the two objects can be readily distinguished in the image. The intensity of pixels in the image is determined by the illumination intensities.

20 Claims, 10 Drawing Sheets

(51) Int. Cl.
*G01J 3/28* (2006.01)
*G06K 9/62* (2006.01)
*H04N 5/235* (2006.01)
*G06K 9/00* (2006.01)
*G06K 9/46* (2006.01)

(52) U.S. Cl.
CPC ......... *G06K 9/6212* (2013.01); *G06K 9/6218* (2013.01); *G06K 9/6268* (2013.01); *G06K 9/6269* (2013.01); *H04N 5/2354* (2013.01); *G01J 2003/2826* (2013.01); *G06K 2009/00644* (2013.01); *G06K 2009/4657* (2013.01)

(56) References Cited

U.S. PATENT DOCUMENTS

| | | | | |
|---|---|---|---|---|
| 9,613,300 | B2* | 4/2017 | Tin | G06K 9/6277 |
| 10,113,910 | B2* | 10/2018 | Brunk | G01J 3/2823 |
| 2008/0122709 | A1* | 5/2008 | Ding | G01J 3/12 |
| | | | | 343/715 |
| 2010/0093015 | A1* | 4/2010 | Panza | G01J 3/10 |
| | | | | 435/29 |
| 2014/0293091 | A1* | 10/2014 | Rhoads | G01J 3/513 |
| | | | | 348/234 |
| 2015/0012226 | A1* | 1/2015 | Skaff | G01N 21/55 |
| | | | | 702/22 |
| 2015/0015887 | A1* | 1/2015 | Tin | G01N 21/55 |
| | | | | 356/445 |
| 2015/0160128 | A1* | 6/2015 | Liu | G01N 21/55 |
| | | | | 356/445 |
| 2015/0219557 | A1* | 8/2015 | Skaff | G01N 21/55 |
| | | | | 702/189 |

OTHER PUBLICATIONS

Robles-Kelly, A., et al. "Imaging Spectroscopy for Scene Analysis: Challenges and Opportunities," IET Comput. Vis., vol. 7, No. 6, p. 467-477 (2013).

Skaff, S., et al., "Learning Optimal Incident Illumination using Spectral Bidirectional Reflectance Distribution Function Images for Material Classification," Journal of Imaging Science and Technology, p. 1-9 (2015).

International Search Report and Written Opinion, International Application PCT/US2017/022724, dated Jul. 25, 2017.

* cited by examiner

$X_{train}$

| Entry # | $R(\lambda_1)$ | $R(\lambda_2)$ | $R(\lambda_3)$ | ... | $R(\lambda_n)$ |
|---|---|---|---|---|---|
| 1 | 0.8 | 0.21 | 0.01 | | 0.58 |
| 2 | 0.69 | 0.02 | 0.03 | | 0.03 |
| 3 | 0.01 | 0.45 | 0.03 | | 0.78 |
| 4 | 0.58 | 0.65 | 0.06 | | 0.95 |
| 5 | 0.28 | 0.36 | 0.58 | | 0.36 |
| 6 | 0.32 | 0.56 | 0.47 | | 0.48 |
| 7 | 0.4 | 0.98 | 0.45 | | 0.47 |
| 8 | 0.09 | 0.87 | 0.69 | | 0.68 |

$y_{train}$

| Object |
|---|
| A |
| A |
| A |
| A |
| B |
| B |
| A |
| A |

Training Data 310

OPTICAL IMPLEMENTATION OF MACHINE LEARNING FOR REAL TIME INCREASED CONTRAST VIA MULTIPLE WAVELENGTH ILLUMINATION WITH TUNABLE POWER

CROSS-REFERENCE TO RELATED APPLICATIONS

The present application is a non-provisional patent application claiming priority to Provisional Patent Application No. 62/310,539, filed Mar. 18, 2016, the contents of which are hereby incorporated by reference.

FIELD OF DISCLOSURE

The present invention generally relates to generating an image with optimized contrast using an imaging system, such as a hyperspectral imaging system.

BACKGROUND

The ability to visually distinguish different objects through imaging is critical for many applications. Oftentimes, the objects to be discerned are different in nature but may appear similar to the naked eye or under a conventional imaging process. For example, in medical imaging and surgical imaging, it is of paramount importance that the surgeon can distinguish between different anatomical structures.

In the conventional process of imaging, the intensity of a pixel in an image sensor is found by physically integrating over the spectral and angular dimensions of the incident spectral illumination. However, since the pixel intensity is found by integrating over the spectral dimensions of the incident light, the conventional imaging process may fail to detect individual spectral components in the incident light that might be able to provide scene-specific or scene-general contrast for distinguishing the objects.

SUMMARY

An imaging system receives an indication to compare a first object and a second object. The imaging system accesses a classification vector for the first object and the second object. The classification vector is extracted by separating a plurality of collected reflectance values for the first object from a plurality of collected reflectance values for the second object. A set of optimal illumination intensities for one or more spectral illumination sources of the imaging system is determined based on the extracted classification vector. The first object and the second object is illuminated with the determined illumination intensities. A high-contrast image of the first object and the second object is provided for display. The intensity of pixels in the image is determined by the illumination intensities.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
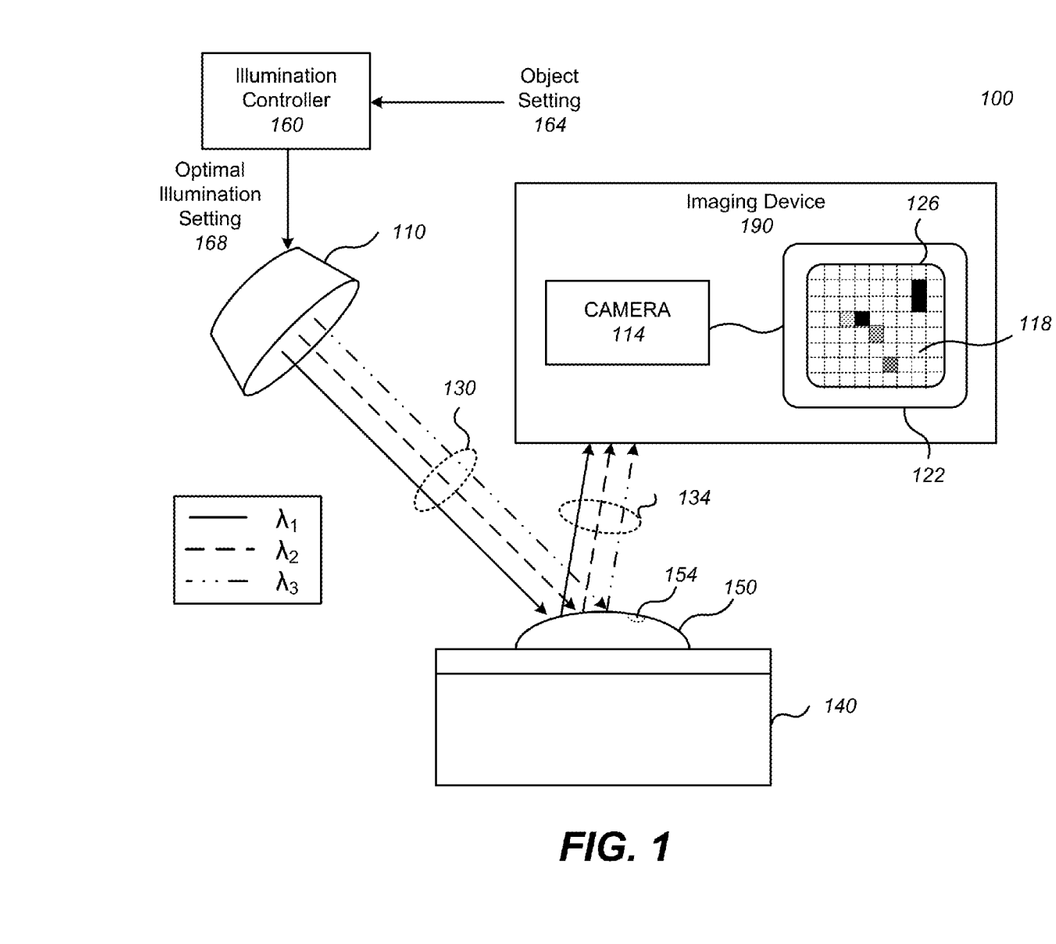
FIG. 1 is an imaging system for displaying an image of an article, according to one embodiment.

FIG. 1 is an imaging system 100 for displaying an image 126 of an article 150, according to one embodiment. A hyperspectral imaging system will be used as an example of the imaging system 100 throughout the application, though other imaging systems could also be used.

The imaging system 100 includes an illumination source 110, a table 140 for supporting an article 150, an imaging device 190, and an illumination controller 160. The imaging device 190 may further include a camera 114, and a monitor 122 for displaying an image 126 of the article 150, or may be an eye that generates an image 126 of the article 150 in the brain. Some embodiments of the imaging system 100 have different or additional modules than the ones described here. Similarly, the functions can be distributed among the modules in a different manner than is described here. Certain modules and functions can be incorporated into other modules of the imaging system 100.

The imaging system 100 displays an image 126 with optimized contrast between two or more objects by adjusting the intensities of each spectral band of the illumination source 110. The article 150 includes two or more objects, such as objects A and B, which are of different nature but are not easily differentiable to the naked eye or to a conventional imaging system. The imaging system 100 displays an image 126B of the article 150 having an optimized contrast between the image portion of A and the image portion of B. That is, the contrast between objects A and B are enhanced in the image 126B compared to that of a conventional imaging system or to the naked eye. This optimized contrast between objects can be useful, for example, in a medical or surgical setting in which a surgeon or other medical personnel must distinguish between two anatomical structures in the body that can appear very similar in a conventional image. The optimized contrast between the anatomical structures instead ensures that these two different structures will clearly stand out to the surgeon as different structures in the image, ensuring that the surgeon is able to readily distinguish the structures during a surgical procedure or in a different medical setting.

Figure 2A:
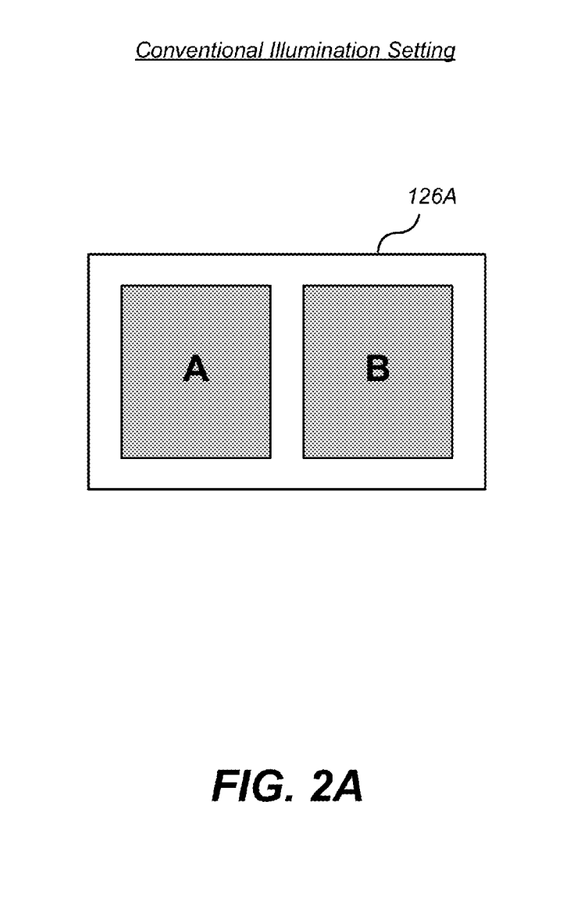
FIG. 2A is an example image generated by a conventional illumination setting, according to one embodiment.
Figure 2B:
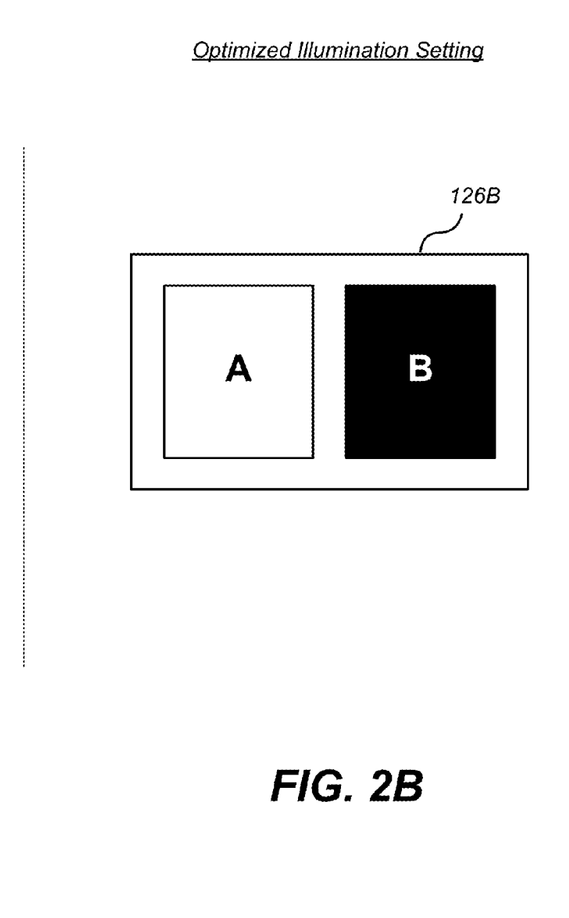
FIG. 2B is an example image generated by an optimized illumination setting, according to one embodiment.

FIG. 2A is an example image 126A generated by a conventional illumination setting, according to one embodiment. FIG. 2B is an example image 126B generated by an optimized illumination setting, according to one embodiment.

As shown in FIG. 2A, conventional image 126A shows an image 126 of an article 150 containing two different objects A and B. Although objects A and B may be of different materials or of different nature, the image portion of object A and the image portion of object B have similar intensity under conventional illumination that makes it difficult to differentiate between the two objects. In contrast, as shown in FIG. 2B, an optimized image 126B generated by adjusting the intensities of the illumination source 110 shows an image of the same article 150, in which the image portion of A and the image portion of object B have significantly different intensities that enhance the discernibility between the two objects.

Returning to FIG. 1, the system 100 illuminates the article 150 with incident light 130 from the illumination source 110 having a combination of light from different spectral bands, detects the intensity of reflected light 134 from the article 150, and generates an image 126 of the article 150 by analyzing the intensity of reflected light 134 with the imaging device 190. As an example, the imaging device 190 may refer to a camera 114 that integrates or sums the reflected intensities for each pixel of the image 126 displayed on the monitor 122. The integrated or summed value is translated into the scale of the pixel for display in image 126. After receiving an object setting 164 indicating two or more objects A and B to be distinguished, the system 100 adjusts the individual illumination intensities of each spectral band in the incident light 130, such that the resulting image 126 is of optimized contrast between the portion of object A and the portion of object B. The system 100 adjusts the illumination intensities by analyzing reflectance data associated with other instances of objects A and B.

The illumination source 110 is a light source that can illuminate the article 150 with light from two or more spectral bands, and also adjust the individual intensities of light for each spectral band. In one embodiment, each spectral band may be a narrow-band that has a relatively small spectral range in the wavelength spectrum of light. Each spectral band may be characterized by a wavelength value, even though a spectral band may correspond to a spectral range of light. For example, as shown in FIG. 1, the illumination source 110 emits incident light 130 having a combination of 3 spectral bands, characterized by $\lambda_1$, $\lambda_2$, and $\lambda_3$, each having a corresponding illumination intensity of $I(\lambda_1)$, $I(\lambda_2)$, and $I(\lambda_3)$. More generally, the illumination source 110 emits incident light 130 with a combination of m spectral bands characterized by $\lambda_{j=1, 2, \ldots, m}$, each having a corresponding intensity of $I(\lambda_1)$, $I(\lambda_2)$, ..., $I(\lambda_m)$.

The imaging device 190 is any device or structure that detects reflected light 134 from article 150 and generates an image 126 of the article 150. In one embodiment, the imaging device 190 may refer to a camera 114 that detects reflected light 134 and generates an image 126 of the article 150 including an array of pixels 118, in which each pixel 118 has a corresponding scale or intensity $I_{pixel}$. In one particular embodiment referred to throughout the remainder of the specification, the image 126 is a grayscale image, in which the intensity $I_{pixel}$ of a pixel 118 corresponds to a level on a quantified grayscale. For example, the intensity $I_{pixel}$ of pixel 118 may correspond to a level on the 8-bit grayscale that quantifies the intensity of light from a scale of 0 to 255. As shown in FIG. 1, grayscale image 126 has several black pixels 118 with the lowest intensity, several white pixels 118 with the highest intensity, and several gray pixels 118 with intensities in between the white and black pixels 118. It is appreciated, however, that in other embodiments the image 126 is a color image, in which the color of a pixel 118 is a combination of quantified intensities on the RGB-scale.

The camera 114 maps a surface area element 154 of the article 150 to a corresponding pixel 118 intensity $I_{pixel}$ by detecting the intensities of reflected light 134 from the surface area element. As shown in the example of FIG. 1, a surface area element 154 of the article 150 is a small portion of the article 150 that may translate to a pixel on the image 126. The article 150 is composed of multiple surface area elements 154. Upon receiving illumination 130 with a single spectral band $\lambda_j$, the intensity $\varphi_j$ of reflected light 134 from a surface element detected by a sensor (not shown) in the camera 114 is given by:

$$\varphi_j = I(\lambda_j) \cdot R(\lambda_j),$$

where $R(\lambda_j)$ is the surface reflectance of the surface area element for spectral band $\lambda_j$. That is, the intensity $\varphi_j$ of reflected light 134 is the proportion of remaining incident light 130 that is reflected off of the surface area element 154 of article 150, determined by the value $R(\lambda_j)$.

Upon detecting the reflected intensities $\varphi_{j=1, 2, \ldots, m}$ for all spectral bands (or from some number of spectral bands) from the illumination source 110, the camera 114 in the FIG. 1 example multiplies, wavelength-by-wavelength, the reflected intensities $\varphi_{j=1, 2, \ldots, m}$ with the spectral response $T(\lambda_1)$, $T(\lambda_2)$, ..., $T(\lambda_m)$ of the camera 114 for each spectral band. The camera 114 generates the intensity $I_{pixel}$ for the corresponding pixel 118 by summing up the results across the spectral bands $\lambda_{j=1, 2, \ldots, n}$. Specifically, the intensity $I_{pixel}$ of the pixel 118 is proportional to the sum:

$$I_{pixel} \propto \sum_{j=1}^{m} I(\lambda_j) \cdot R(\lambda_j) \cdot T(\lambda_j).$$

The above equation may refer to the pixel intensity of a single grayscale channel, or to the pixel intensity of any one of the red, green, and blue (RGB) channels of the camera 114.

In another embodiment, the imaging device 190 may refer to an eye. That is, the image 126 may refer to an image 126 of the article 150 generated in the brain by processing the reflected intensities through structures or cells in the eye. Since the functionality of a camera 114 and the eye are similar, the system 100 may also adjust the individual illumination intensities of each spectral band of light on the article 150, such that one observing the article 150 sees an optimized contrast between illuminated objects A and B. Similarly to the embodiment of a camera 114, the intensity of reflected light $I_{surface}$ of a corresponding surface area element 154 may be given by:

$$I_{surface} \propto \sum_{j=1}^{m} I(\lambda_j) \cdot R(\lambda_j) \cdot T(\lambda_j)$$

where $T(\lambda_j)$ is now the spectral response of the human eye. For example, the equation above may indicate the intensity of light or the strength of electrical signal generated by one or more photoreceptors of the eye by absorbing photons of short (S), medium (M), and long (L) wavelengths.

If each element $I(\lambda_j) \cdot T(\lambda_j)$ for all spectral bands $\lambda_{j=1, 2, \ldots, m}$ is concatenated into a column vector V, and if each reflectance value $R(\lambda_j)$ for all spectral bands $\lambda_{j=1, 2, \ldots, m}$ is concatenated into a column vector R, the intensity of the pixel 118 (or a corresponding surface area element 154) can be reformulated as:

$$I_{pixel} \propto V^T R.$$

That is, the intensity $I_{pixel}$ of the pixel 118 is a dot product of vector V associated with the quantities $I(\lambda_1) \cdot T(\lambda_1)$, $I(\lambda_2) \cdot T(\lambda_2)$, ..., $I(\lambda_m) \cdot T(\lambda_m)$, and vector R associated with the reflectance values $R(\lambda_1)$, $R(\lambda_2)$, ..., $R(\lambda_m)$ of the corresponding surface area element.

The illumination controller 160 receives an object setting 164 indicating the two or more objects A and B to be distinguished, and tunes the illumination intensities $I(\lambda_1)$, $I(\lambda_2)$, ..., $I(\lambda_m)$ of incident light 130 through optimal illumination setting 168 such that the system 100 illuminates the article 150 to have optimized contrast between object A and object B when seen through an imaging device 190 such as a camera 114 or the eye. Specifically, when a camera 114 is used as the imaging device 190, the system 100 having an optimal illumination intensity setting 168 for the illumination source 110 may generate an image 126B such that the pixel intensity difference between the image portion of object A and the image portion of object B is greater compared to that of a conventional or un-optimized illumination intensity setting.

The optimal illumination setting 168 is found by analyzing past or present reflectance data associated with other instances of objects A and B and extracting a classification vector having a direction that separates reflectance values between the objects. Thus, by tuning the illumination intensities in the imaging system 100, the system can generate an image in which the two objects look different or have a greater contrast that they would in an image in which the illumination intensities have not been tuned in this way. Returning to the example in the medical setting, there will be a much greater contrast between the anatomical structures that otherwise appeared very similar, such that the structures are clearly discernible to the physician as different anatomical structures. A more detailed description of the illumination controller 160 is provided below in reference to FIG. 3.

Illumination Controller

Figure 3:
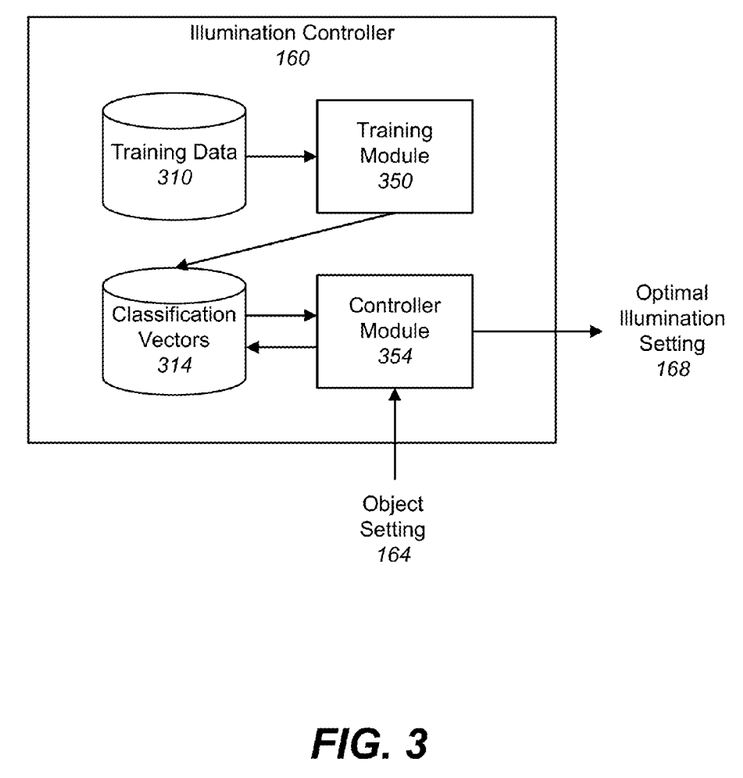
FIG. 3 is a block diagram illustrating the illumination controller, according to one embodiment.

FIG. 3 is a block diagram illustrating the illumination controller 160, according to one embodiment.

The illumination controller 160 includes a training module 350, a controller module 354, a data store for training images 310, and a data store for classification vectors 314. Some embodiments of the illumination controller 160 have different or additional modules than the ones described here. Similarly, the functions can be distributed among the modules in a different manner than is described here. Certain modules and functions can be incorporated into other modules of the illumination controller 160.

Training Module

The training module 350 receives a set of training data 310 that contains reflectance values for multiple instances of two or more objects A and B (e.g., different instances of a human bladder versus a human kidney), identifies a classification vector $V_C$ that points along a direction separating the reflectance values between the two or more objects, and stores the identified classification vector $V_C$ in classification vectors 314.

Training Data

Figure 4:
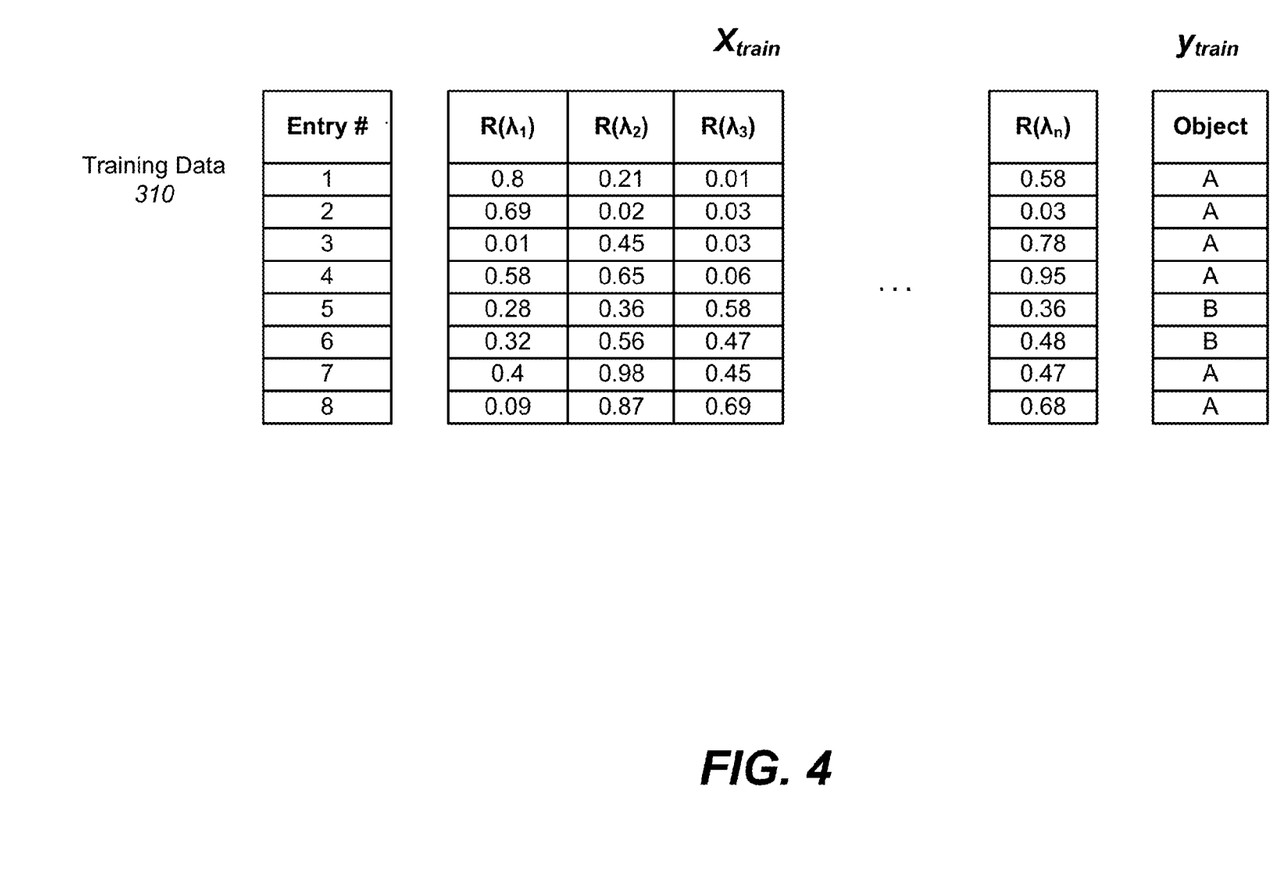
FIG. 4 illustrates example training data provided to the training module for identifying a classification vector, according to one embodiment.

FIG. 4 illustrates example training data 310 provided to the training module 350 for identifying a classification vector, according to one embodiment.

The training data 310 contains a series of reflectance values $R(\lambda_j)$ for surface area elements of an object instance, across multiple instances of the object. As shown in FIG. 4, the training data 310 contains a pair of matrices ($X_{train}$, $y_{train}$), in which each row is an entry corresponding to a surface area element of either an instance of object A or object B. Each column in $X_{train}$ is an independent feature that corresponds to the collected reflectance value $R(\lambda_j)$ for the surface area element when illuminated with light from spectral band $\lambda_j$. Thus, the matrix $X_{train}$ in FIG. 4 contains m columns or features, corresponding to reflectance values for each spectral band $\lambda_{j=1, 2, \ldots, m}$. The vector $y_{train}$ is a column vector of already known labels indicating the object category of a corresponding entry in $X_{train}$. That is, each entry in $y_{train}$ indicates the object category of the set of reflectance values $R(\lambda_j)$ in the corresponding entry. For example, the vector $y_{train}$ in FIG. 4 contains labels indicating whether a corresponding entry in $X_{train}$ belongs to either object A or object B.

Herein, a row of reflectance values $R(\lambda_1)$, $R(\lambda_2)$, ..., $R(\lambda_m)$ for entry i in $X_{train}$ is denoted as vector $R_i$, and the corresponding object label for the entry in $y_{train}$ is denoted as $y_i$.

In one embodiment, the training data 310 is collected by sequentially illuminating an instance of an object (e.g., an instance of object A or B) with light from spectral bands $\lambda_1$, $\lambda_2$, ..., $\lambda_m$, generating m images corresponding to each spectral band $\lambda_j$ for that object, and extracting the reflectance values $R(\lambda_1)$, $R(\lambda_2)$, ..., $R(\lambda_m)$ for the surface area elements composing the object. This process is repeated for multiple instances of the object. Thus, the reflectance values for an object are collected not only across multiple surface area elements composing the object, but also across multiple instances of the object. The reflectance values for an object may be collected by any one or a combination of integrating sphere measurements, Fourier transform infrared spectroscopy (FT-IR), or hyperspectral imaging, but is not limited thereto.

Identification of Classification Vector

Figure 5:
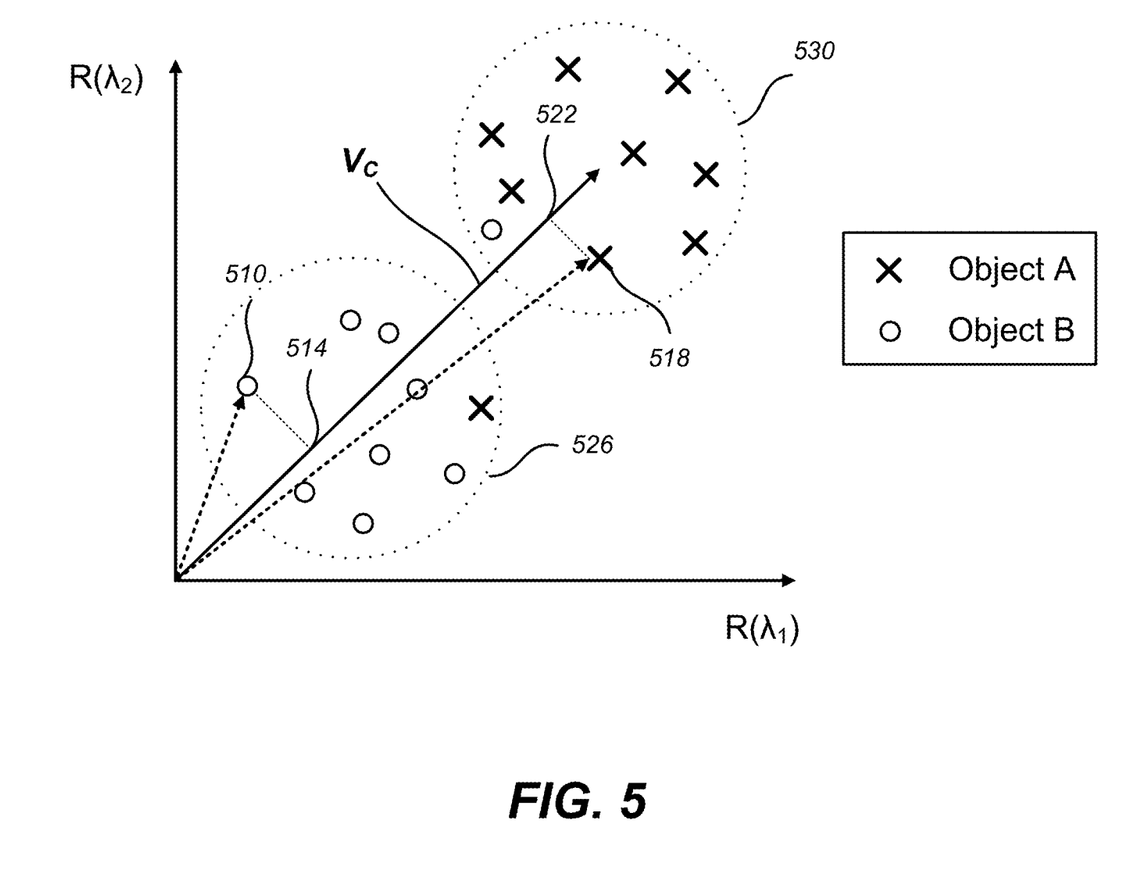
FIG. 5 illustrates a classification vector $V_c$ for two objects A and B, according to one embodiment.

FIG. 5 illustrates a classification vector $V_C$ for two objects A and B, according to one embodiment.

The training module 350 identifies a classification vector $V_C$ that points along a direction separating reflectance values between the two or more objects A and B. That is, the direction of the classification vector $V_C$ travels from one set of reflectance values predominantly associated with one object category, to another set of reflectance values predominantly associated with a different object category. Since the classification vector $V_C$ spans across reflectance values for m spectral bands $\lambda_{j=1, 2, \ldots, m}$, the classification vector is an m-dimensional vector in the spectral band space.

FIG. 5 shows a series of reflectance values $R(\lambda_1)$, $R(\lambda_2)$ for training data 310 entries belonging to object A (plotted with the symbol "X"), and reflectance values for training data 310 entries belonging to object B (plotted with the symbol "O"). Point 510 may correspond to the reflectance values in the first row of the training data 310, given by vector $R_1$. Point 518 may correspond to the reflectance values in the second row of the training data 310, given by vector $R_2$.

The training module 350 identifies a set of reflectance values containing points associated with one object category, and another set of reflectance values containing points associated with a different object category. For example, the set 526 identified by the training module 350 contains points mostly associated with object B, and the set 530 contains points mostly associated with object A. The training module 350 further identifies a classification vector $V_C$ having a direction separating the two sets of reflectance values. As shown in FIG. 5, the classification vector $V_C$ points along a direction separating the reflectance values of objects A and B. In other words, the direction of the classification vector $V_C$ travels from the set 526 of reflectance values associated with object A, to another set 530 of reflectance values associated with object B.

In one embodiment, the training module 350 identifies the classification vector $V_C$ by training one or more classifiers that separate the reflectance values between two or more objects A and B. In one particular embodiment referred throughout the remainder of the specification, the classifier is a linear support vector machine classifier (SVM). It is appreciated, however, that in other embodiments the classifier can be any classifier that can classify a data point into one among multiple categories. For example, the classifier can be any classifier in which the classification is done by an inner product or a series of inner products, similarly to the linear SVM classifier.

Figure 6:
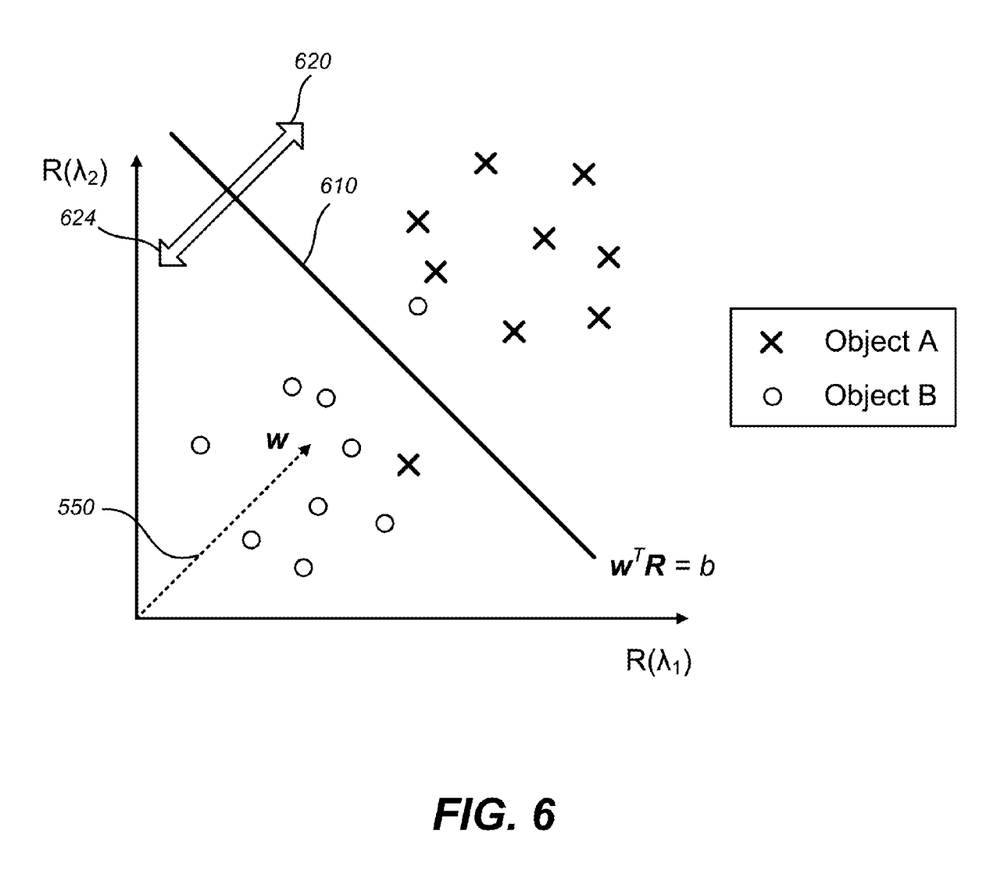
FIG. 6 is an example classifier trained by the training module, according to one embodiment.

FIG. 6 is an example classifier 610 trained by the training module 350, according to one embodiment.

The training module 350 constructs a trained classifier 610 by extracting a weight vector w and a threshold parameter b from the training data 310. The resulting classifier is a boundary in the form of a line or hyperplane that separates the feature space of the training data 310 into two or more disjoint regions, in which a set of reflectance values in one region is associated with a corresponding object category. In the example shown in FIG. 6, the classifier 610 is a line dividing the two-dimensional feature space into one region 620 mostly containing reflectance values for object A, and another region 624 mostly containing reflectance values for object B.

The boundary constructed by the classifier 610 is a collection of points that satisfy a condition specified by a function of the weight vector w and the threshold parameter b. Specifically, the classifier 610 in FIG. 6 satisfies:

$$w^T R = b,$$

where w is the weight vector, b is the threshold parameter, R is a vector variable indicating any point in the feature space, and $w^T R$ is an affine classifying function. The numerical values of the weight vector w and the threshold parameter b are extracted from the training data 310 by the training module 350.

In one embodiment, the training module 350 may identify the weight vector w perpendicular to the classifier 610 as the classification vector $V_C$. Since the classification vector $V_C$ is perpendicular to the classifier 610, and the classifier 610 is constructed as the boundary between reflectance values of different objects, the direction of the classification vector $V_C$ naturally points along a direction that separates the different groups of reflectance values.

Alternatively, the training module 350 may identify classification vector $V_C$ through other means than a classifier. For example, the training module 350 may train a cluster of reflectance values associated with object A, and another cluster associated with object B using any clustering algorithm. In such a case, the training module 350 may identify classification vector $V_C$ to be the vector from a point within one cluster to another. As another example, the training module 350 may identify the classification vector $V_C$ through various distance metrics between the reflectance values of the training data 310, instead of extracting the classification vector $V_C$ through an analytical model.

Returning to FIG. 5, with regard to the projection $V_C^T R$ on the classification vector $V_C$, due to the separating direction of the classification vector $V_C$, the projection $V_C^T R$ for a set 526 of reflectance values associated with one object are grouped towards one end of the classification vector $V_C$ including mostly low values, while the projection $V_C^T R$ for a set 530 of reflectance values associated with a different object are grouped towards the opposite end of the classification vector $V_C$ including mostly higher values. For example, the projection 514 of point 510 associated with object B is of a lower value than the projection 522 of point 518 associated with object A.

Moreover, when the classification vector $V_C$ is the weight vector w of the classifier 610, the projection $V_C^T R$ is related to the perpendicular distance from the classifier 610. Specifically, the projection $V_C^T R$ for reflectance values in region 620 increases as the distance is farther away from the classifier 610, while the projection $V_C^T R$ for reflectance values in region 624 decreases as the distance is farther away from the classifier 610. The relationship between the projection $V_C^T R$ and the imaging system 100 will be described in further detail in reference to the controller module 354 below.

In one embodiment, the training module 350 may identify a range of classification vectors instead of one classification vector $V_C$. For example, a range of classification vectors may be given by an interval centered around $V_C$:

$$V_C + \Delta(V_C),$$

where $\Delta(V_C)$ is a vector containing negative or positive elements within a predetermined range. After identifying the classification vector $V_C$ or a range of classification vectors for two or more objects A and B, the training module 350 stores the identified classification vector or range in classification vectors 314.

Controller Module

Returning to FIG. 3, the controller module 354 receives an object setting 164 indicating two or more objects A and B to be distinguished, retrieves the corresponding classification vector for the objects A and B in classification vectors 314, and outputs an optimal illumination setting 168 indicating the optimal intensities of the illumination source 110 that will generate an image 126B of an article 150 with optimized contrast between the image potion of A and the image portion of B. The optimized illumination setting 168 mimics the values of the retrieved classification vector $V_C$. Article 150 may include a new instance of objects A and B that were not included in the training data 310, but are of similar nature to those instances used in the training data 310. Alternatively, article 150 may include instances of objects A and B that were included in the training data 310.

Identification of Optimal Illumination Setting

After retrieving the corresponding classification vector $V_C$, the controller module 354 identifies the optimal illumination setting 168 by finding illumination intensities $I_{opt}(\lambda_1), I_{opt}(\lambda_2), \ldots, I_{opt}(\lambda_m)$ that result in the quantity $T(\lambda_j) \cdot I(\lambda_j)$ being equal to or proportionate to the j-th element of the classification vector $V_C$ for each spectral band $\lambda_{j=1, 2, \ldots, m}$. This condition is given by:

$$T(\lambda_j) \cdot I_{opt}(\lambda_j) \propto [V_C]_j, \forall j=1,2,\ldots,m,$$

where $[V_C]_j$ denotes the j-th element of $V_C$. Since the spectral response $T(\lambda_j)$ may be different for each type of imaging device 190, the optimal illumination setting 168 may differ depending on the type of imaging device 190 used in the system 100. For example, the spectral response of a camera 114 may significantly differ from the eye, leading to different optimal illumination settings 168 depending on the type of imaging device 190.

In one embodiment, the optimal illumination intensities $I_{opt}(\lambda_1), I_{opt}(\lambda_2), \ldots, I_{opt}(\lambda m)$ may be a scalar multiple of the elements of classification vector $V_C$. In another embodiment, the illumination intensities $I_{opt}(\lambda_1), I_{opt}(\lambda_2), \ldots, I_{opt}(\lambda_m)$ may be a translation of the elements of classification vector $V_C$. That is, the optimal illumination intensity $I_{opt}(\lambda_j)$ may be given by:

$$I_{opt}(\lambda_j) = c_{0j} \cdot [V_C]_j + c_{1j}, \forall j=1,2,\ldots,m,$$

where $c_{0j}, c_{1j}$ are constants. For example, the controller module 354 may offset the values of the classification vector $V_C$, if the classification vector $V_C$ contains negative elements. Specifically, the controller module 354 may offset the elements of the classification vector by the negative most element in $V_C$, such that the translated elements are all positive. As another example, the controller module 354 may take the absolute values of the classification vector $V_C$ in determining the optimal illumination intensities.

The controller module 354 may also identify an optimal illumination setting 168 containing a range of optimal illumination intensities. For example, the range of optimal illumination intensities for spectral band $\lambda_j$ may be given by an interval centered around $I_{opt}(\lambda_j)$:

$$I_{opt}(\lambda_j) + \Delta_{opt}(\lambda_j),$$

where $\Delta_{opt}(\lambda_j)$ is a negative or positive value within a predetermined range. As another example, the controller module 354 may identify a range of optimal illumination intensities as the optimal illumination setting 168 by translating or scaling a range of classification vectors received from the training module 350.

Relationship Between Pixel Intensity and Projection

In the embodiment of a camera 114 as the imaging device 190, the resulting intensity of a pixel $I_{pixel}$ in the image 126B generated using the optimal illumination setting 168 is proportional to the projection $V_C^T R$ of its corresponding surface area element reflectance onto the classification vector $V_C$. As described in further detail in reference to FIG. 7, the corresponding image 126B generated using the optimal illumination setting 168 for two or more objects A and B retains a high contrast between the pixel intensities for object A and object B.

As discussed in reference to FIG. 1, the imaging process itself resulted in the pixel intensity $I_{pixel}$ to be determined by the relationship:

$$I_{pixel} \propto V^T R,$$

where each element in V contains the quantity $I(\lambda_j) \cdot T(\lambda_j)$ of each spectral band $\lambda_j$, and each element in R contains the reflectance value $R(\lambda_j)$ of each spectral band $\lambda_j$ for a corresponding surface area element.

Consequently, if the illumination intensities $I(\lambda_1), I(\lambda_2), \ldots, I(\lambda_m)$ are set within a range specified by the optimal illumination setting 168, the intensity of a pixel $I_{pixel}$ in image 126 will be proportional to the projection $V_C^T R$ of its surface area element reflectance vector onto the classification vector $V_C$. This relationship is given by:

$$I_{pixel} \propto V^T R \propto V_C^T R.$$

Similar relationships between light intensity and the classification vector can be deduced for other type of imaging devices 190, such as the eye.

Figure 7:
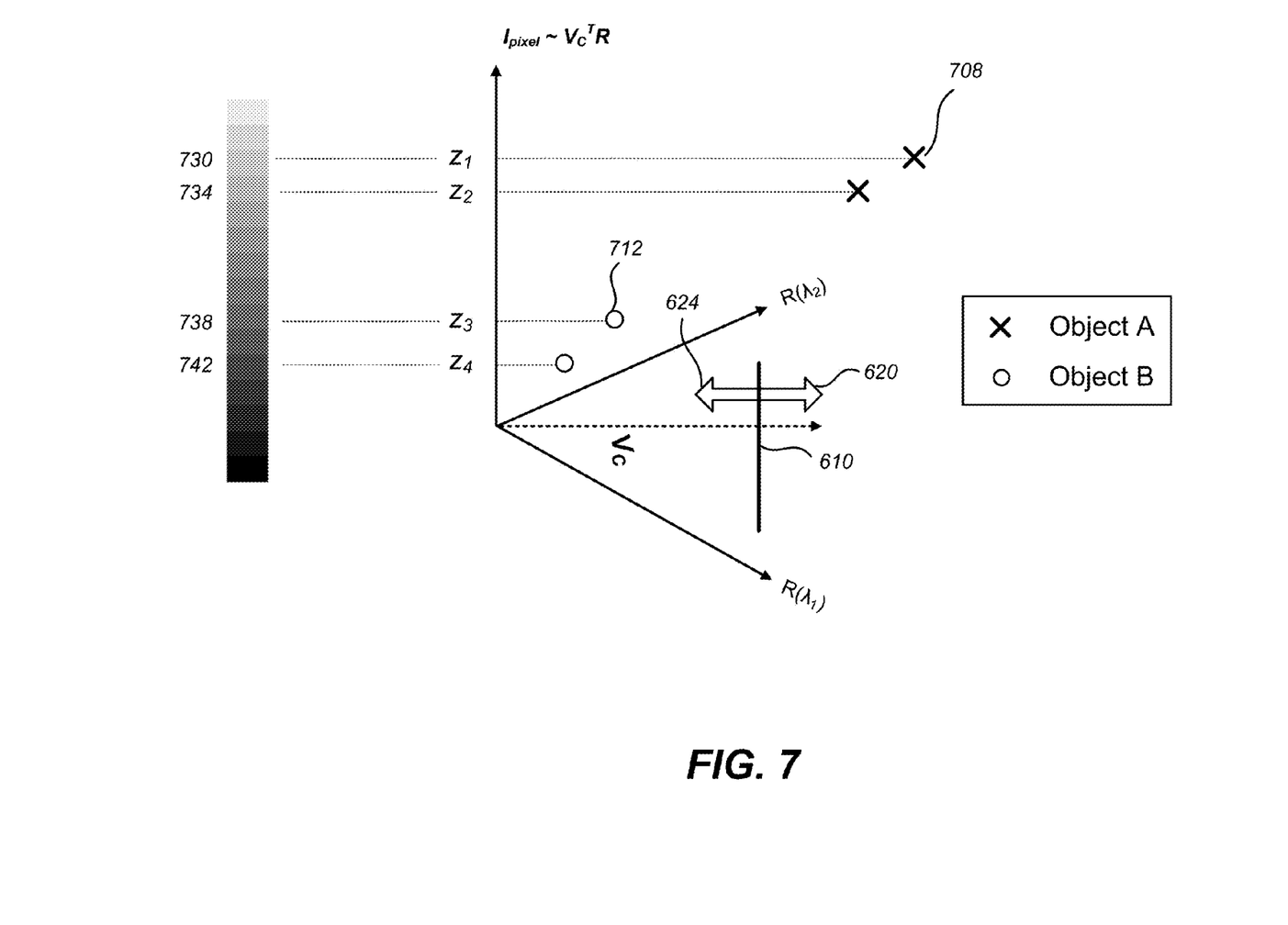
FIG. 7 illustrates the relationship between a pixel intensity $I_{pixel}$ in image, and the projection of the corresponding surface area element reflectance onto the classification vector $V_C$ retrieved from the classifier in FIG. 6, according to one embodiment.

FIG. 7 illustrates the relationship between pixel intensity $I_{pixel}$ in image 126, and the projection of the corresponding surface area element reflectance onto the classification vector $V_C$ retrieved from the classifier 610 in FIG. 6, according to one embodiment.

As shown in FIG. 7, point 708 represents reflectance values $R(\lambda_1), R(\lambda_2)$ for a surface area element associated with object A illuminated under the optimal illumination setting 168. Similarly, point 712 represents reflectance values for an element associated with object B. As discussed above, points 708 and 712 may indicate reflectance values from new instances of objects A and B that were not available in the training data 310, or indicate reflectance values from instances of objects A and B that were available in the training data 310.

In the case of a new instance of objects A and B, the projection of the reflectance values onto the identified classification vector $V_C^T R$ have similar distributions to that identified for the training data 310, since the article 150 illuminated by the optimal illumination setting 168 contains an instance of objects A and B with similar nature to those instances used in the training data 310.

That is, for both reflectance values available and unavailable in the training data 310, the projections $V_C^T R$ associated with one object are mapped to low values, while the projections associated with a different object are mapped to higher values. Moreover, the pixel intensity $I_{pixel}$ that results from the optimal illumination setting 168 is proportional to the projection $V_C^T R$. Thus, in the process of imaging, the pixel intensities $I_{pixel}$ for surface area elements associated with one object category are mapped to low values, while the intensities for a different object category are mapped to higher values, resulting in a high-contrast image 126 of the objects.

For example, as shown in FIG. 7, the projection of a new point 708 associated with object A is mapped to a high value $z_1$ because the reflectance of the corresponding surface area element is distributed within the region 620. As a result, the intensity of the corresponding pixel is a light-gray color indicated by 730. As another example, the projection of point 712 associated with object B is mapped to a lower value $z_3$ because the reflectance of the corresponding surface area element is distributed within the region 624. As a result, the corresponding pixel results in a dark-gray color indicated by 738.

In one embodiment, the intensities of the pixels $I_{pixel}$ can be mapped to color scales other than the grayscale. For example, the camera 114 may map pixel intensities $I_{pixel}$ to intensities of a single color (e.g., red) instead of the grayscale. As another example, the pixel intensities $I_{pixel}$ may be mapped to a red-green color scale, in which low intensities are mapped towards the red color and high intensities are mapped towards the green color, or vice versa. As another example, the pixel intensities may be mapped along any dimension of a color space (e.g., Lab color space, XYZ color space, etc.).

As a result of the separation of reflectance values, the contrast between the image portions of different objects in the optimized image generated by the optimal illumination setting 168 may be higher than that in an image generated by a conventional illumination intensity setting outside the range of the optimal illumination setting 168. Specifically, the difference between pixel intensities of the different image portions in an optimized image generated by the optimal illumination setting 168 may be larger than that in an image generated by a conventional illumination intensity setting outside the range of the optimal illumination setting 168. As another example, the difference between electrical signals generated by one or more photoreceptors of the eye for the different portions under an optimal illumination setting 168 may be larger than that of a conventional illumination setting outside the range of the optimal illumination setting 168.

Figure 8:
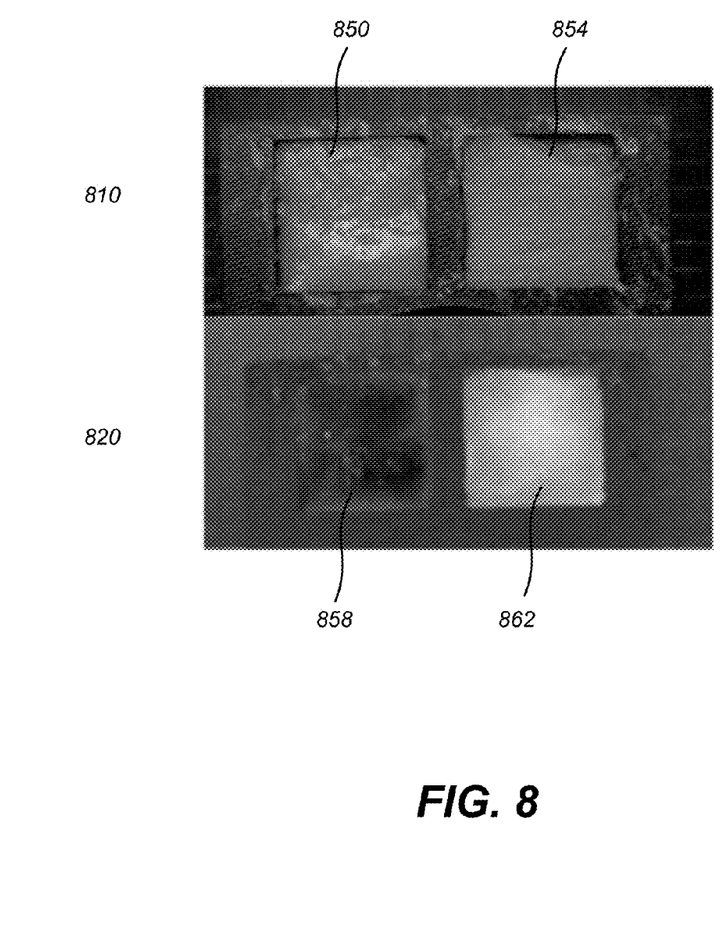
FIG. 8 shows an un-optimized image of turkey meat and chicken meat under conventional illumination, and an optimized image of the same under optimal illumination.

FIG. 8 shows an un-optimized image 810 of turkey meat and chicken meat under conventional illumination, and an optimized image 820 of the same under optimal illumination.

As shown in FIG. 8, the system 100 generates a low-contrast image 810 of chicken meat 850 and turkey meat 854 under conventional illumination. In contrast, the system 100 generates a high-contrast image 820 of chicken meat 858 and turkey meat 862 under optimal illumination using a classification vector extracted through the training module 350. Pixels corresponding to chicken meat 858 are mapped to low intensities, while pixels corresponding to turkey meat 862 are mapped to higher intensities. Similarly, in a medical setting, different anatomical structures, organs, tissues, tissue states or properties, etc. that might appear similar in the low-contrast image under conventional illumination will appear distinct under the illumination settings using the classification vector extracted through the training module 350. Thus, the physician can immediately distinguish between two organs that might outside of these settings appear nearly the same, thereby avoiding mistakes and improving patient outcomes, and also saving time associated with a medical procedure or diagnosis.

In one embodiment, the illumination controller 160 may determine to use only select spectral illumination sources based on the magnitude of the classification vector elements. For example, the illumination controller 160 may illuminate the article 150 with spectral illumination sources corresponding to elements of the classification vector that have a magnitude above a predetermined threshold. A classification vector element $[V_C]_j$ having a high weight indicates that the reflectance values between the different object categories are highly separated along the spectral band $\lambda_j$, and thus, indicates that the spectral illumination source for the spectral band should be used for enhancing the contrast between the different objects.

Figure 9:
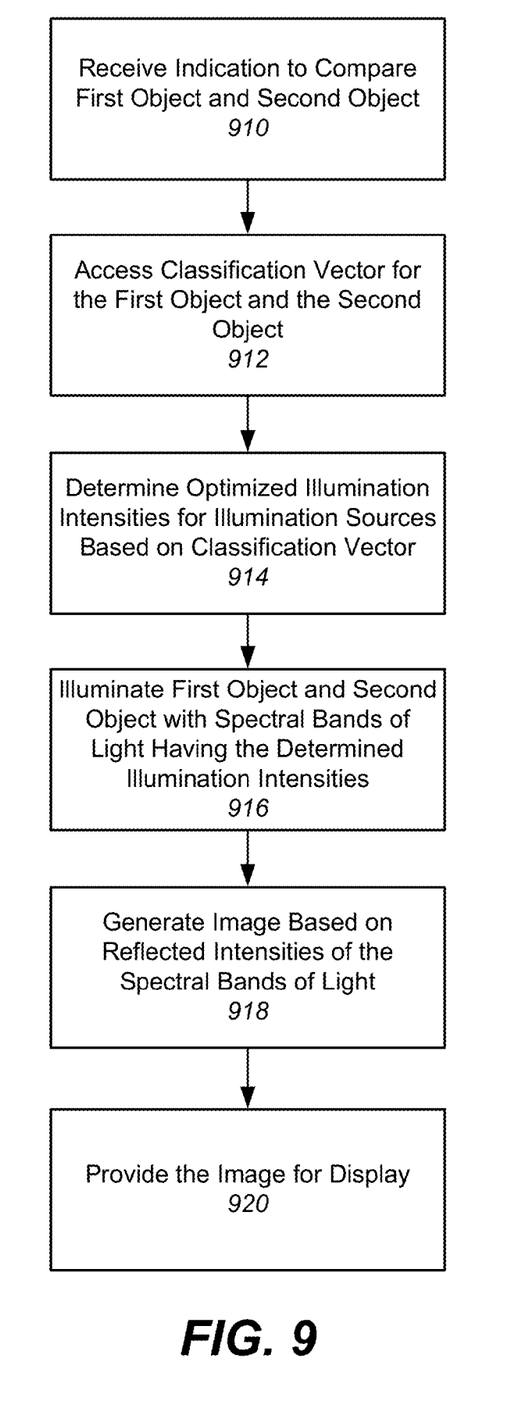
FIG. 9 is a flowchart illustrating the process of generating an image with optimized contrast between two or more objects A and B using the imaging system of FIG. 1, according to one embodiment.

FIG. 9 is a flowchart illustrating the process of generating an image with optimized contrast between two or more objects A and B using an imaging system, such as the imaging system of FIG. 1 or one or more components thereof, according to one embodiment.

The imaging system 100 or a component thereof receives 910 an indication to compare a first object and a second object. For example, this may be an instruction by a user, such as a physician, to compare two structures (e.g., two human or animal organs) or an instruction to generate images of two structures. The imaging system 100 accesses 912 the corresponding classification vector for the first object and the second object. The classification vector is extracted by separating reflectance values for the first object from the reflectance values for the second object. The optimized illumination intensities for the spectral illumination sources are determined 914 based on the retrieved classification vector. The first object and the second object are illuminated 916 with spectral bands of light having the determined illumination intensities. An image of the first object and the second object is generated 918 based on the reflected intensities of the spectral bands of light reflected off of the first object and the second object. An optimized contrast image(s) of the first object and the second object are provided 920 for display.

In another embodiment, the method includes a component of an imaging system or a module associated with an imaging system that interacts with the imaging system. For example, the controller module 354 might operate separate from the imaging system. In this case, the controller module receives 910 from the imaging system and indication to compare two objects or receives an object setting, accesses 912 the corresponding classification vector for the objects, and determines 914 the optimized illumination intensities for the spectral illumination sources based on the classification vector, and the spectral response of the imaging device 190. The module then sends to the imaging system the appropriate illumination settings that can then be used as settings for the illumination sources of the imaging system in illuminating the objects to ultimately generate the image of the objects. Thus, the steps 916 and 918 are performed by the imaging system, and the separate controller module simply sends to the imaging system the illumination intensities to use in generating a high-contrast image.

Figure 10:
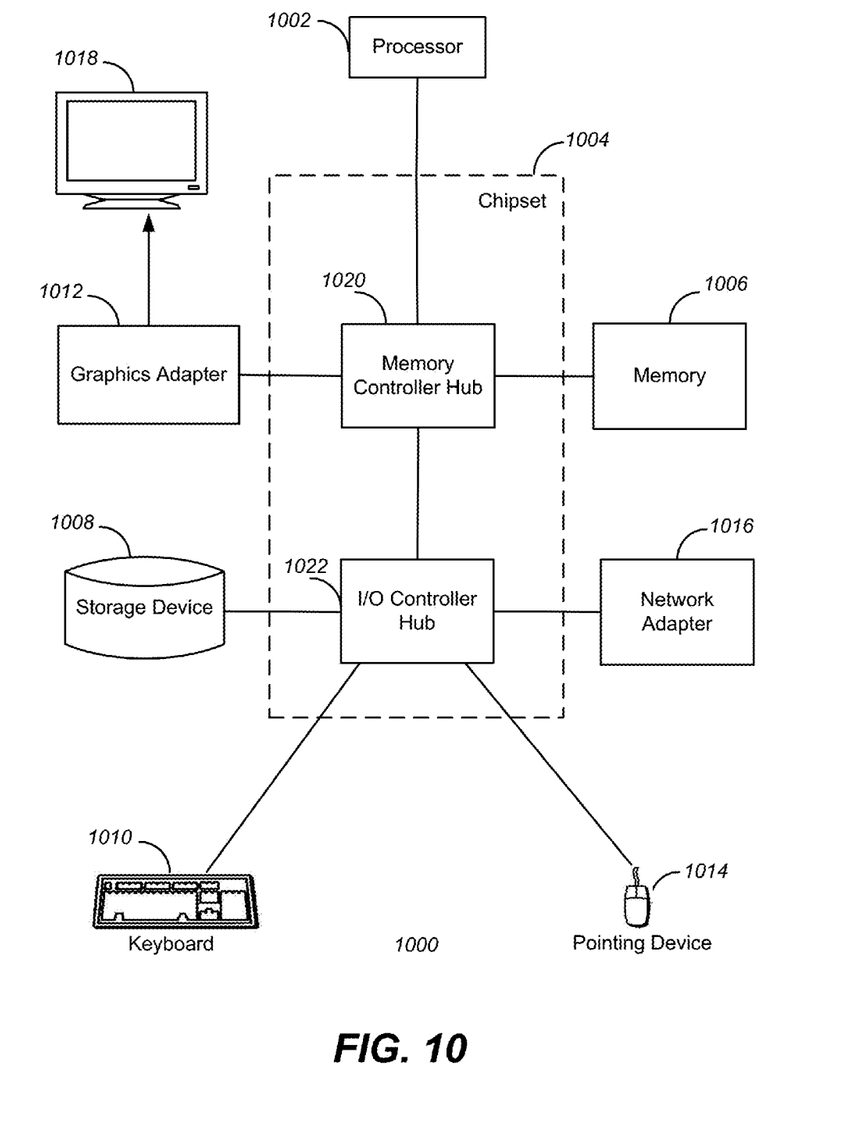
FIG. 10 is a block diagram of a computer for implementing the illumination controller, according to one embodiment.

FIG. 10 is a block diagram of a computer 1000 for implementing the illumination controller 160, according to one embodiment.

The computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display 1018 is coupled to the graphics adapter 1012. A storage device 1008, an input device 1014, and network adapter 1016 are coupled to the I/O controller hub 1022. Other embodiments of the computer 1000 have different architectures.

The storage device 1008 is a non-transitory computer-readable storage medium such as a hard drive, compact disk read-only memory (CD-ROM), DVD, or a solid-state memory device. The memory 1006 holds instructions and data used by the processor 1002. The input interface 1014 is a touch-screen interface, a mouse, track ball, or other type of pointing device, a keyboard, or some combination thereof, and is used to input data into the computer 1000. In some embodiments, the computer 1000 may be configured to receive input (e.g., commands) from the input interface 1014 via gestures from the user. The graphics adapter 1012 displays images and other information on the display 1018. The network adapter 1016 couples the computer 1000 to one or more computer networks.

The types of computers 1000 can vary depending upon the embodiment and the processing power required by the entity. The computers 1000 can lack some of the components described above, such as graphics adapters 1012, and displays 1018.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for generating an image with optimized contrast using an imaging system. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method comprising:
    receiving an indication to compare a first object and a second object with an imaging system;
    accessing a classification vector for the first object and the second object, the classification vector having been extracted by separating a plurality of collected reflectance values for the first object from a plurality of collected reflectance values for the second object;
    determining, from the extracted classification vector, an optimized set of illumination intensities to apply to one or more spectral illumination sources of the imaging system, each of the one or more spectral illumination sources configured to provide illumination to the first object and the second object with one or more spectral bands of light having the optimized set of illumination intensities;
    illuminating the first object and the second object with the one or more spectral bands of light having the optimized set of illumination intensities;
    generating, with the imaging system, an image of the first and second objects, the image comprising an array of image pixels based on reflected intensities of the one or more spectral bands of light, wherein an intensity of each of the image pixels is determined according to the optimized set of illumination intensities; and
    providing the image for display with the imaging system.

2. The method of claim 1, wherein generating the array of image pixels further comprises:
    for each image pixel, detecting the reflected intensities of the one or more spectral bands of light reflected off of a corresponding surface area on the first object or the second object; and
    combining the reflected intensities to generate the intensity of the image pixel in the image.

3. The method of claim 1, wherein determining the optimized set of illumination intensities further comprises:
    identifying a range of optimized illumination intensities from the classification vector; and
    determining the optimized set of illumination intensities from within the range of optimized illumination intensities.

4. The method of claim 1, wherein the plurality of collected reflectance values for the first object and the second object are separated by a support vector machine (SVM) classifier.

5. The method of claim 4, wherein a weight vector of the SVM classifier is extracted as the classification vector.

6. The method of claim 1, wherein the plurality of collected reflectance values for the first object and the second object are separated by a clustering algorithm to generate a cluster of reflectance values associated with the first object and a cluster reflectance values associated with the second object.

7. The method of claim 6, wherein a vector pointing from the cluster associated with the first object to the cluster associated with the second object is extracted as the classification vector.

8. The method of claim 1, wherein the illumination intensities are determined by scaling elements of the classification vector by a first constant, or by translating the elements of the classification vector by a second constant.

9. The method of claim 1, wherein the classification vector is extracted by:
    collecting one or more instances of the first object and one or more instances of the second object;

illuminating the instances of the first object and the instances of the second object with each individual spectral band of light from the one or more spectral bands of light;

generating one or more maps corresponding to the one or more spectral bands of light for each instance of the first object and each instance of the second object, each map comprising an array of pixels based on reflected intensities of the corresponding spectral band of light;

identifying a subset of pixels corresponding to an instance of the first object or an instance of the second object in each map; and extracting the plurality of reflectance values for the first object and the plurality of reflectance values for the second object from the subset of pixels identified in each map.

10. The method of claim 9, wherein generating the one or more maps further comprises:

for each pixel, detecting the reflected intensity of the corresponding spectral band of light reflected off of a surface area of an instance of the first object or an instance of the second object; and generating the intensity of the pixel in the map proportionate to the detected reflected intensity.

11. The method of claim 9, wherein the plurality of reflectance values for the first object and the second object are diffused reflectance values.

12. An imaging system, comprising:

a controller comprising a computer configured to:
receive an indication to compare a first object and a second object;
access a classification vector for the first object and the second object, the classification vector having been extracted by separating a plurality of collected reflectance values for the first object from a plurality of collected reflectance values for the second object; and
determine, from the extracted classification vector, an optimized set of illumination intensities;

one or more spectral illumination sources configured to:
provide illumination to the first object and the second object with one or more spectral bands of light having the optimized set of illumination intensities; and a camera configured to:
generate an image of the first and second objects, the image comprising an array of image pixels based on reflected intensities of the one or more spectral bands of light, wherein an intensity of each image pixel is determined according to the optimized set of illumination intensities; and
display the image.

13. The system of claim 12, wherein the camera is further configured to:

for each image pixel, detect the reflected intensities of the one or more spectral bands of light reflected off of a corresponding surface area on the first object or the second object; and combine the reflected intensities to generate the intensity of the image pixel in the image.

14. The system of claim 12, wherein the plurality of collected reflectance values for the first object and the second object are separated by a support vector machine (SVM) classifier.

15. The system of claim 14, wherein the classification vector is extracted as the weight vector of the SVM classifier.

16. The system of claim 12, wherein the plurality of collected reflectance values for the first object and the second object are separated by a clustering algorithm to generate a cluster of reflectance values associated with the first object and a cluster of reflectance values associated with the second object.

17. The system of claim 16, wherein a vector pointing from the cluster associated with the first object to the cluster associated with the second object is extracted as the classification vector.

18. The system of claim 12, wherein each of the illumination intensities for the one or more spectral illumination sources have a one-to-one correspondence with each of the elements of the classification vector.

19. The system of claim 12, wherein the computer is further configured to determine the illumination intensities by scaling elements of the classification vector by a first constant, and/or by translating the elements of the classification vector by a second constant.

20. A method comprising:

receiving an indication to compare a first object and a second object with an imaging system;

accessing a classification vector for the first object and the second object, the classification vector having been extracted by separating a plurality of collected reflectance values for the first object from a plurality of collected reflectance values for the second object;

determining, from the extracted classification vector, an optimized set of illumination intensities to apply to one or more spectral illumination sources of the imaging system based on a spectral response of an imaging device of the imaging system, each of the one or more spectral illumination sources configured to provide illumination to the first object and the second object with one or more spectral bands of light having the optimized set of illumination intensities; and providing to the imaging system the optimized set of illumination intensities for simultaneously illuminating the first object and the second object with the one or more spectral bands of light having the optimized set of illumination intensities.

* * * * *